US012229723B2

United States Patent
Navarre et al.

(10) Patent No.: US 12,229,723 B2
(45) Date of Patent: Feb. 18, 2025

(54) PRODUCTION ASSET LIBRARY MANAGEMENT

(71) Applicant: Disney Enterprises, Inc., Burbank, CA (US)

(72) Inventors: Katharine S. Navarre, Los Angeles, CA (US); Evan A. Binder, Los Angeles, CA (US); Andrew E. Wood, Pasadena, CA (US); Drew E. Perlman, Los Angeles, CA (US); Megan Stifter, Los Angeles, CA (US); Michael Breymann, San Francisco, CA (US); Willian Padovani Germano, Sao Paulo (BR)

(73) Assignee: Disney Enterprises, Inc., Burbank, CA (US)

( * ) Notice: Subject to any disclaimer, the term of this patent is extended or adjusted under 35 U.S.C. 154(b) by 468 days.

(21) Appl. No.: 17/326,158

(22) Filed: May 20, 2021

(65) Prior Publication Data

US 2021/0374674 A1 Dec. 2, 2021

Related U.S. Application Data

(60) Provisional application No. 63/032,356, filed on May 29, 2020.

(51) Int. Cl.
*G06Q 10/101* (2023.01)
*G06F 8/38* (2018.01)
(Continued)

(52) U.S. Cl.
CPC ............ *G06Q 10/101* (2013.01); *G06F 8/38* (2013.01); *G06F 16/444* (2019.01); *G06F 16/45* (2019.01); *G06F 16/483* (2019.01)

(58) Field of Classification Search
CPC ....... G06Q 10/101; G06F 8/38; G06F 16/444; G06F 16/45; G06F 16/483
See application file for complete search history.

(56) References Cited

U.S. PATENT DOCUMENTS 7,603,357 B1 * 10/2009 Gourdol .............. G06F 16/1774
718/107
9,411,982 B1 * 8/2016 Dippenaar .......... G06F 21/6245
(Continued)

OTHER PUBLICATIONS

Calori, Luigi, Silvano Imboden, and Antonella Guidazzoli. "Open source tools for collaboration in cultural heritage digital assets production pipeline." 2015 Digital Heritage. vol. 2. IEEE, 2015. (Year: 2015).*

(Continued)

*Primary Examiner* — Corey Russ
(74) *Attorney, Agent, or Firm* — Farjami & Farjami LLP

(57) ABSTRACT

A computing platform including a processing hardware and a memory storing a software code is coupled to at least first and second workstations and a production asset library. The processing hardware executes the software code to send, from the first workstation, a request identifying a production asset and metadata specification to the second workstation, and receive, from the second workstation, a payload including the production asset and production asset data including preview metadata describing a 3D image of the production asset. The software code further provides the 3D image for display on the first workstation or a third workstation, receives, at the first workstation or the third workstation, a validation input for the production asset, and publishes, in response to receiving the validation input, the production asset data to the production asset library.

24 Claims, 9 Drawing Sheets

(51) Int. Cl.
*G06F 16/44* (2019.01)
*G06F 16/45* (2019.01)
*G06F 16/483* (2019.01)

(56) References Cited

U.S. PATENT DOCUMENTS

| | | | |
|---|---|---|---|
| 9,418,067 B1 | 8/2016 | Vice et al. | |
| 10,217,185 B1 | 2/2019 | Cabanero et al. | |
| 2006/0253542 A1* | 11/2006 | McCausland | H04L 51/04 |
| | | | 709/207 |
| 2006/0265688 A1* | 11/2006 | Carlson | G06F 8/36 |
| | | | 717/101 |
| 2007/0033156 A1* | 2/2007 | Limpert | G06F 16/93 |
| 2007/0038931 A1* | 2/2007 | Allaire | G06Q 30/0239 |
| | | | 715/208 |
| 2009/0217352 A1 | 8/2009 | Shen et al. | |
| 2010/0131547 A1 | 5/2010 | Magrath et al. | |
| 2010/0287529 A1* | 11/2010 | Costa | G06F 8/34 |
| | | | 717/105 |
| 2011/0047217 A1* | 2/2011 | Arnaud | G06F 16/41 |
| | | | 709/205 |
| 2011/0217023 A1* | 9/2011 | Haot | G11B 27/3027 |
| | | | 386/E5.028 |
| 2012/0254791 A1* | 10/2012 | Jackson | G06F 3/0482 |
| | | | 715/781 |
| 2014/0310746 A1 | 10/2014 | Larsen et al. | |
| 2015/0024852 A1* | 1/2015 | Pacey | A63F 13/58 |
| | | | 463/43 |
| 2016/0350716 A1* | 12/2016 | Raghunath | G06F 40/117 |
| 2016/0366196 A1* | 12/2016 | Boss | G06Q 10/101 |
| 2018/0373434 A1 | 12/2018 | Switzer et al. | |
| 2019/0294721 A1 | 9/2019 | Keifer et al. | |
| 2020/0159396 A1 | 5/2020 | Breymann et al. | |
| 2020/0183968 A1 | 6/2020 | Breymann et al. | |
| 2021/0086080 A1* | 3/2021 | Zhu | A63F 13/75 |
| 2021/0184859 A1* | 6/2021 | Wilbrecht | H04L 9/0618 |
| 2021/0209127 A1* | 7/2021 | McGregor | G06F 21/6218 |
| 2023/0135598 A1* | 5/2023 | Ben-Yaacov | G06Q 40/08 |
| | | | 705/26.1 |

OTHER PUBLICATIONS

Romney, Gordon W., and Donald W. Parry. "A digital signature signing engine to protect the integrity of digital assets." 2006 7th International Conference on Information Technology Based Higher Education and Training. IEEE, 2006. (Year: 2006).*

* cited by examiner

```
libcard_6384.json
File  Edit  View  Project  Debug  Team  Tools  Test  Analyze  Window  Help libcard_6384.json
Schema: <No Schema Selected>

1   "DMD": {
 2     "Header": {
 3       "project": ,
 4       "company": "Disney",
 5       "genpub_version": "0.14.0",
 6       "job": "999J"
 7     },
 8     "PublishData": {
 9       "note": "6384",
10       "delivery": "",
11       "description": "Launching Pixelized Hair Look Dev,"
12     },
13     "AssetData": {
14       "Rig Version": "dmd_char : text",
15       "type": "char",
16       "id": 1405,
17       "Artist Name": "dmd_char, dmd_prop, dmd_set : text",
18       "Description": "dmd_char, dmd_prop, dmd_set : text",
19     }
20   }
21 }
```

| Librarian: Asset Data Check-In |

DMD Library Card

Header
- project:
- company:
- genpub_version: 0.14.0
- job: 999U

Publish Data
- note: 6384
- description: Launching                    Pixelized Hair Look Dev.
- delivery: SCL183_200504_unity

Asset Data
- Fred
  - Artist Name:
  - Description: 1st Pass on     Pixelized Hair
  - Rig Version: v20

[ Ok ]  [ Cancel ]

Mode: Asset Metadata Modification

FIG. 4

PRODUCTION ASSET LIBRARY MANAGEMENT

RELATED APPLICATION(S)

The present application claims the benefit of and priority to a Provisional Patent Application Ser. No. 63/032,356, filed May 29, 2020, and titled "Production Asset Library Management," which is hereby incorporated fully by reference into the present application.

The present application is related to U.S. patent application Ser. No. 16/267,335, filed Feb. 4, 2019, and titled "Techniques for Automatically Exposing 3D Production Assets to an Editorial Workstation in a Content Creation Pipeline," which claims the benefit of U.S. Provisional Patent Application Ser. No. 62/777,022, filed Dec. 7, 2018, and titled "Techniques for Content Libraries in Animated Production," which are hereby incorporated herein by reference in their entireties.

BACKGROUND

Production assets, such as computer generated images for use in movies, television (TV) or streaming content, or video games, for example, are typically produced by members of an on-premises creative team that may include artists, animators, lighting designers, and set designers, to name a few creative roles, and may also involve the participation of off-premises third party vendors of creative services or creative groups who are geographically or departmentally separated from the core team. Production assets are often produced in an iterative process in which a production team member or a third party vendor generates an initial version of a production asset and then other team members or third party vendors modify that initialized production asset multiple times, causing the production asset to be exported off-premises and ingested into an on-premises production asset library or database several times.

Nevertheless, the interests of data security and operational efficiency mandate that each production asset be inspected and validated prior to or upon re-ingestion into the on-premises asset library. However, conventional approaches to inspection and validation are typically performed manually, through human review of raw data files accompanying the production asset, which is a time consuming and costly approach that can substantially hinder the process of finalizing the production asset.

BRIEF DESCRIPTION OF THE DRAWINGS

FIG. 3 depicts an exemplary library file for a production asset generated using a recipe authoring mode of the multi-mode UI provided by software code implemented in the systems shown in FIGS. 1A and 1B, according to one implementation;

FIG. 4 depicts an asset metadata modification mode of a multi-mode user interface (UI) provided by the software code implemented in the system shown in FIGS. 1A and 1B, according to one implementation;

DETAILED DESCRIPTION

Figure 1A:
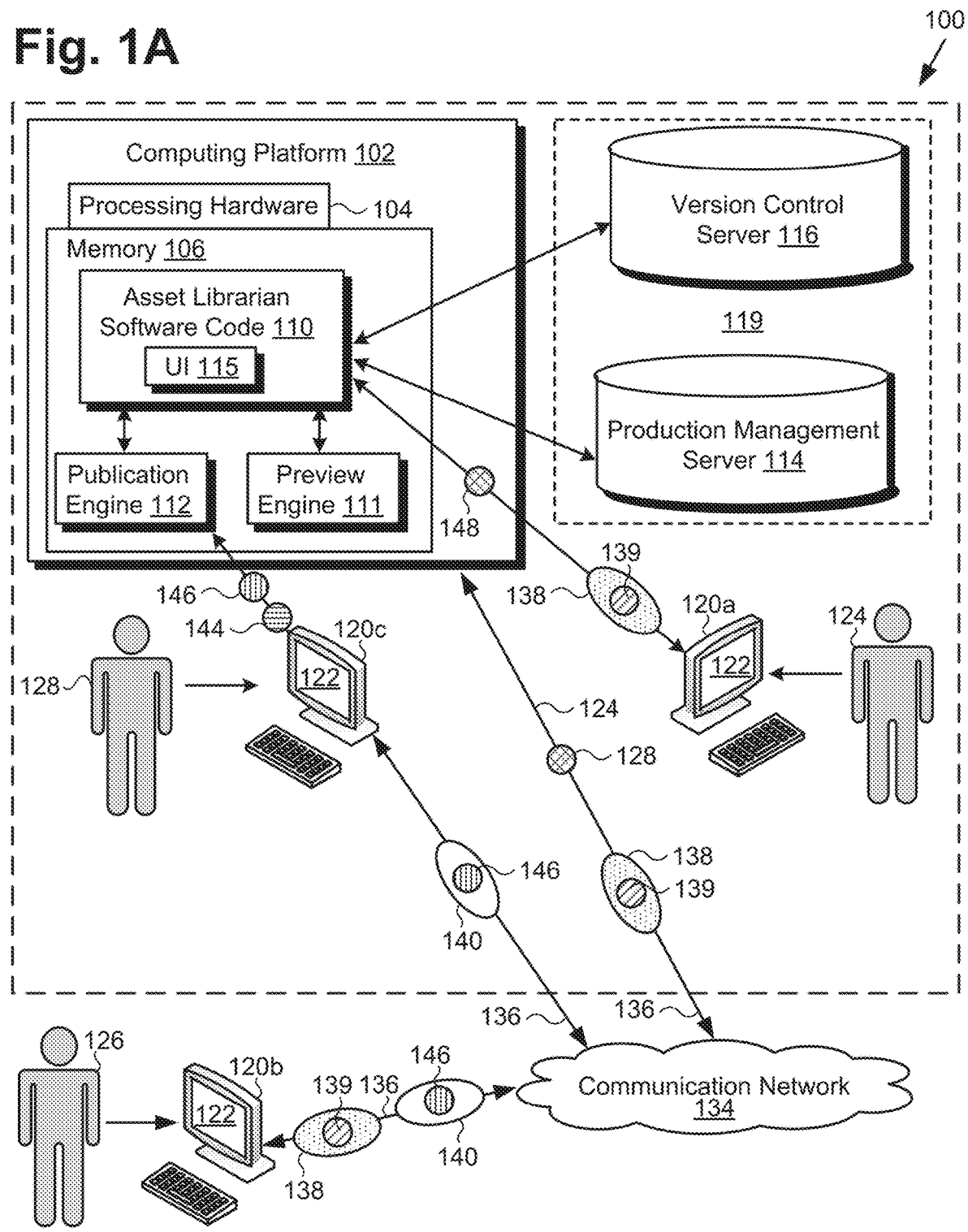
FIG. 1A shows a diagram of a system for performing production asset library management, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application is directed to systems and methods for performing production asset library management that address and overcome the deficiencies in the conventional art. In traditional animated content creation, for example, an editorial process typically involves a pre-rendering of an animated content into a two-dimensional (2D) series of frames. In this type of workflow, before these new assets are delivered for ingestion into an editorial environment, an editor performs validation to ensure that there are no breaking changes caused by the new assets and that no incorrect assets are being ingested, as these issues would become noticeable once a pre-rendered sequence is generated. In contrast, in a real-time workflow, validation of the new assets falls on either a production manager or a real-time editor, who is composing a story using three-dimensional (3D) assets. As such, there is a need for a more robust suite of tools to ensure adequate validation of the new assets before they are ingested, in order to save significant efforts during a subsequent production process. By reviewing metadata entries provided by those authoring the 3D assets, or leveraging such metadata to generate a visual preview, or both, the production manager or the editor can perform their tasks more efficiently.

The present production asset library management systems and methods provide 2D and 3D asset publishing and management tools that advantageously help to enable a process of exposing 2D and 3D production assets when generating editorial cuts in a content creation pipeline. That is to say, the present solutions help to gate entry into a production database to assets that conform to specifications defined by the editors and artists, which may be particularly important in workflows that outsource a significant portion of the asset creation or are dispersed geographically. It is noted that exemplary workflows for automatically exposing published 3D production assets, which is a process enabled by asset publishing and management tools described in the present application, are described in U.S. patent application Ser. No. 16/267,335, filed Feb. 4, 2019, and titled "Techniques for Automatically Exposing 3D Production Assets to an Editorial Workstation in a Content Creation Pipeline." As noted above, this patent application is incorporated fully by reference into the present application.

It is noted that, the production asset library management system and methods disclosed herein may advantageously be implemented as substantially automated systems and methods. As defined in the present application, the terms "automation" and "automated," refer to systems and processes that do not require human intervention. The term "substantially automated," refers to systems and processes that require minimal human participation. Thus, the methods described in the present application may be largely performed under the control of hardware processing components of the disclosed automated systems.

It is further noted that, as defined in the present application, the term "production asset" can refer to any form of computer generated artistic content produced for use in movies, animation, television (TV) or streaming content, or video games. Examples of production assets may include 2D or 3D digital objects such as models for instance, 2D or 3D animations or other images, or 2D or 3D video sequences, to name a few.

FIG. 1A shows a diagram of system 100 for performing production asset library management, according to one exemplary implementation. As shown in FIG. 1A, system 100 includes computing platform 102 communicatively coupled to multiple workstations, such as exemplar, workstations 120a, 120b, and 120c each having a respective display 122. In addition, computing platform 102 is coupled to production asset library 119 including production management server 114 and version control server 116. Computing platform 102 includes processing hardware 104 and memory 106 implemented as a computer-readable non-transitory storage medium. According to the present exemplary implementation, memory 106 stores asset librarian software code 110 providing multi-mode user interface (UI) 115, as well as preview engine 111 and publication engine 112 in the form of respective game engines, for example, where preview engine 111 is a visual development environment.

As further shown in FIG. 1A, system 100 is implemented within a use environment including communication network 134 providing network communication links 136. Also shown in FIG. 1A are users 124, 126, 128 of respective workstations 120a, 120b, and 120c of system 100, request 138 identifying production asset 144 and including specification 139, and payload 140 received from user 126 of workstation 120b by system 100 in response to request 138. In addition, FIG. 1A shows library file 146 linked to production asset 144 and included in payload 140. FIG. 1A further shows notification 148 alerting user 124 that library file 146 has been published to production asset library 119.

Although in the implementation shown in FIG. 1A computing platform 102 is shown to be coupled to three workstations utilized by three different users, i.e., workstations 120a, 120b, and 120c utilized by respective users 124, 126, and 128, that representation is provided merely as an example. In other implementations, system computing platform 102 may be coupled to two workstations utilized by two users. For example, this may occur in a use case in which users 124 and 128 are the same person (and, optionally, workstations 120a are 120c are the same machine). Alternatively, users 124 and 128 may be different users that utilize the same workstation, e.g., workstation 120a or 120c, with different roles or privileges. As yet another alternative, users 124 and 126 may be different users utilizing a cloud computing resource pool where workstations are spun up and down on demand, or simply a shared cloud computing resource. In some of those latter implementations, workstations 120a and 120b may be, in effect, the same workstation.

It is noted that, in some implementations, workstation 120b and user 126 may correspond to hardware and human resources that are included as part of system 100 but are geographically remote from computing platform 102, departmentally sequestered from computing platform 102, or both. However, in other implementations, workstation 120b and user 126 may correspond to remote hardware and human resources provided by a third party vendor of creative services.

It is further noted that although FIG. 1A shows library file 146 being generated on workstation 120b by user 126 after request 138 has been received from computing platform 102, in some implementations, library file 146 may be generated on workstation 120a by user 124 and may include (1) request 138, and (2) metadata specification 139 provided with request 138, which describes production asset 144. Where, as shown in FIG. 1A, library file 146 is generated on workstation 120b after receipt of request 138, library file 146 may include request 138, metadata specification 139 provided with request 138, and production asset data provided by user 126 that includes preview metadata describing a 3D image of production asset 144 (production asset data and preview metadata identified by respective reference numbers 245 and 247 in FIGS. 2A and 2B. That is to say, regardless of whether library file 146 is generated by user 124 on workstation 120a or user 126 on workstation 120b, production asset data including the preview metadata is added by user 126 at workstation 120b.

It is noted that the production asset data described above are essentially the asset metadata values that correspond to the properties of the production asset that need to be updated or populated by user 126 once metadata specification 139 has been created by user 124 or user 126. The described preview metadata may include a preview reference image or video, or metadata that can be leveraged to automatically generate a visual preview of the production asset, for example. In use cases in which the preview metadata is a preview reference image or video, it may be separate from library file 146. However, in use cases in which it is metadata that can be leveraged to automatically generate a visual preview, it may be part of library file 146, e.g., a "value" that corresponds to a "preview" property of the production asset. In implementations in which library file 146 is generated on workstation 120a, library file 146 may include request 138 and metadata specification 139 provided with request 138 and describing production asset 144, but may initially omit production asset 144 and the production asset data provided by user 126 as part of payload 140.

Although the present application refers to asset librarian software code 110, preview engine 111, and publication engine 112 as being stored in memory 106 for conceptual clarity, more generally, memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 104 may include multiple hardware processing units, such as one or more central processing units, one or more graphics processing units, and one or more tensor processing units. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as asset librarian software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Moreover, in some implementations, communication network 134 may be a high-speed network suitable for high performance computing (HPC), for example a 10 GigE network or an Infiniband network.

Although workstations 120a, 120b, and 120c of system 100 are shown as desktop computers in FIG. 1A, that representation is provided merely as an example as well. More generally, workstations 120a, 120b, and 120c may be any suitable mobile or stationary computing devices or systems that include display 122 and implement data processing capabilities sufficient to implement the functionality ascribed to workstations 120a, 120b, and 120c herein. For example, in other implementations, workstations 120a, 120b, and 120c may take the form of laptop computers, tablet computers, or smartphones, for example.

With respect to displays 122 of workstations 120a, 120b, and 120c, display 122 may be implemented as a liquid crystal display (LCD), light-emitting diode (LED) display, organic light-emitting diode (OLED) display, quantum dot (QD) display, or any other suitable display screen that perform a physical transformation of signals to light. Furthermore, display 122 may be physically integrated with workstations 120a, 120b, and 120c or may be communicatively coupled to but physically separate from workstations 120a, 120b, and 120c. For example, where workstations 120a, 120b, and 120c are implemented as smartphones, laptop computers, or tablet computers, display 122 will typically be integrated with workstations 120a, 120b, and 120c. By contrast, where workstations 120a, 120b, and 120c are implemented as desktop computers, display 122 may take the form of a monitor separate from workstations 120a, 120b, and 120c in the form of computer towers.

It is noted that the present production asset management systems and methods are agnostic as to the specific production management software and version control software utilized by respective production management server 114 and version control server 116. That is to say, production management server 114 may utilize any of a variety of different production management software suites, while version control server 116 may analogously utilize any of a variety of different version control software suites. One example of suitable production management software is Shotgun Software™, while an example of suitable version control software is Perforce™ software. Although Shotgun Software™ and Perforce™ software are referenced in an exemplary system of the present disclosure, other exemplary systems implemented according to the present disclosure may use other production management and version control software.

Figure 1B:
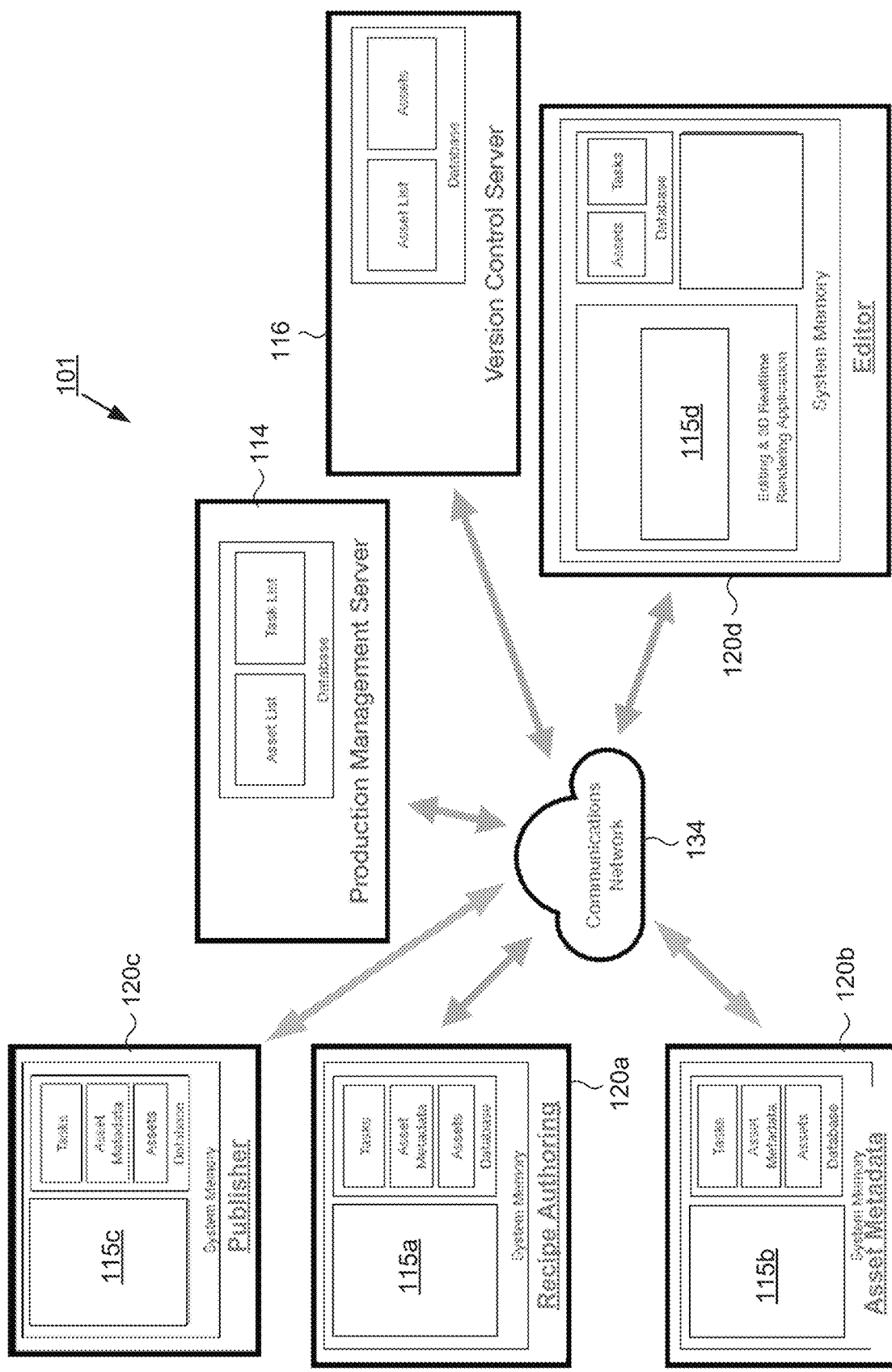
FIG. 1B shows a diagram of an exemplary cloud-based or other distributed implementation of a system for performing production asset library management.

It is further noted that although FIG. 1A depicts computing platform 102, production management server 114, version control server 116, and workstations 120a and 120c of system 100 as being co-located in an integrated creative environment, such as a content production studio, that representation is merely exemplary. Referring to diagram 101 in FIG. 1B, in some implementations, the functionality provided by many of the features shown in FIG. 1A may be provided by distributed resources, such as cloud-based resources, for example, interactively linked by communication network 134. It is also noted that features identified in FIG. 1B by reference numbers identical to those appearing in FIG. 1A correspond respectively to those previously described features, and may share any of the characteristics attributed to those corresponding features, above. Moreover, as shown in FIG. 1B, multi-mode UI 115 may be utilized in a variety of different modes including recipe authoring mode 115a, asset metadata modification mode 115b, publisher mode 115c, and real-time editing and rendering mode 115d, as described in greater detail below.

By way of overview, the production asset library management solution disclosed in the present application includes authoring a set of instructions or "recipe" for a 3D or 2D production asset (or a change to an existing 3D or 2D production asset) using a "library card" metaphor, i.e., library file 146 in FIG. 1A, in the form of a Java Script Object Notation (JSON) file, for example, which flows from system 100 to user 126 at workstation 120b and informs decisions made about what production assets to create or alter for inclusion in production asset library 119. The software components included in asset librarian software code 110 and executed by the present systems enable the generation, updating and publication of library file 146 within system 100, as well as by user 126, and provide multi-mode UI 115 for defining and writing data to text files to manage how 3D and 2D production assets move between the various workstations and databases shown in FIG. 1A.

Figure 2A:
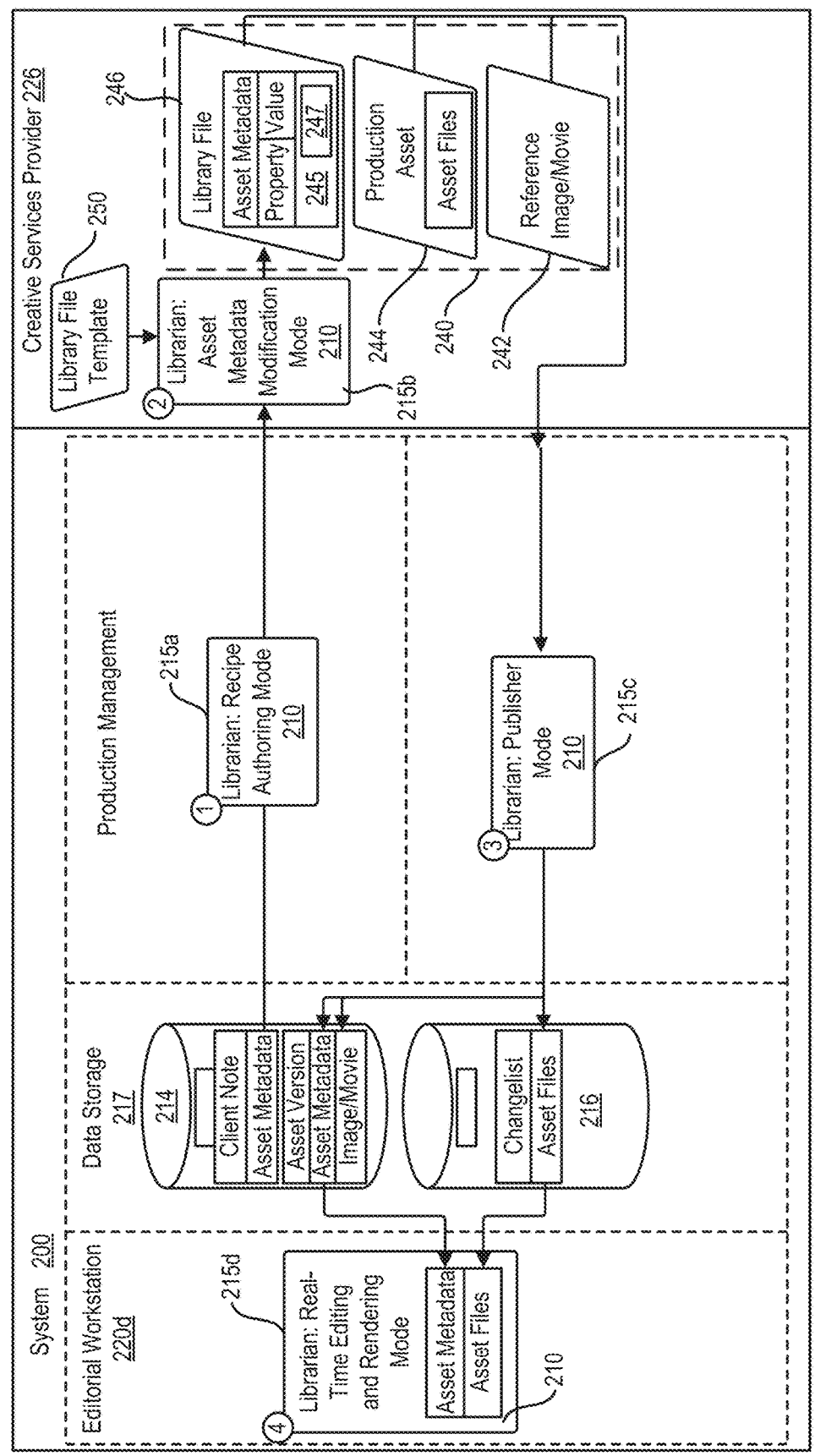
FIG. 2A shows a diagram depicting an exemplary production pipeline of the exemplary systems shown in FIGS. 1A and 1B, according to one implementation.

Referring to FIG. 2A, FIG. 2A shows a diagram depicting exemplary production pipeline 201A, according to one implementation. Production pipeline 201A includes system 200 communicatively coupled to creative services provider 226. In addition, FIG. 2A shows asset librarian software code 210, representations of recipe authoring mode 215a, asset metadata modification mode 215b, publisher mode 215c, and real-time editing and rendering mode 215d of multi-mode UI 115, in FIG. 1A. Also shown in FIG. 2A are library file 246 including production asset data 245 and preview metadata 247, library file template 250, and payload 240 including library file 246, production asset 244, and reference image or movie 242 for production asset 244. FIG. 2A further shows data storage 217 of production asset library 119, in FIG. 1A, which includes production management database 214 and version control database 216. Production management database 214 corresponds to the storage resources of production management server 114, in FIGS. 1A and 1B, while version control database 216 corresponds to the storage resources of version control server 116 in those figures.

System 200, asset librarian software code 210, payload 240, production asset 244, and library file 246, in FIG. 2A, correspond respectively in general to system 100, asset librarian software code 110, payload 140, production asset 144, and library file 146, in FIG. 1A. That is to say, system 200, asset librarian software code 210, payload 240, production asset 244, and library file 246 may share any of the characteristics attributed to respective system 100, asset librarian software code 110, payload 140, production asset 144, and library file 146 by the present disclosure, and vice versa. It is noted that creative services provider 226, in FIG. 2A, corresponds in general to user 126 in FIG. 1A. Consequently creative services provider 226 (hereinafter "user 226") may share any of the characteristics attributed to user 126 by the present disclosure, and vice versa. That is to say, user 226 may correspond to human resources and associated hardware resources that are included as part of system 200 but are geographically remote from computing platform 102, in FIG. 1A, departmentally sequestered from computing platform 102, or both. Moreover, in other implementations, user 226 may correspond to a third party vendor of creative services.

In addition, recipe authoring mode 215a, asset metadata modification mode 215b, publisher mode 215c, and real-time editing and rendering mode 215d, in FIG. 2A, correspond respectively in general to recipe authoring mode 115a, asset metadata modification mode 115b, publisher mode 115c, and real-time editing and rendering mode 115d of multi-mode UI 115, shown in FIGS. 1A and 1B. Thus, recipe authoring mode 215a, asset metadata modification mode 215b, publisher mode 215c, and real-time editing and rendering mode 215d may share any of the characteristics attributed to respective recipe authoring mode 115a, asset metadata modification mode 115b, publisher mode 115c, and real-time editing and rendering mode 115d by the present disclosure, and vice versa.

Referring to FIGS. 1A and 2A in combination, according to one implementation of the present production asset library management solution, user 124 of system 100/200 may utilize workstation 120a to launch asset librarian software code 110/210, which may then be used by user 124 in recipe authoring mode 115a/215a to generate request 138 identifying production asset 144/244 and including metadata specification 139. Request 138 may be received from workstation 120a by computing platform 102 of system 100/200 and may be transferred to user 126/226 at workstation 120b.

In one implementation, user 126/226 may utilize asset librarian software code 110/210 in asset metadata modification mode 115b/215b to generate library file 146/246 using library file template 250, to provide production asset data 245 including preview metadata 247, and to modify the values of metadata specification 139 provided with request 138. It is noted that in some implementations, the modification options for metadata specification 139 may be determined by a controlled taxonomy that has been predefined by, for example, production management. By way of example, the controlled taxonomy may provide a constrained list of artist names or preview metadata types for user 126/226 to select from. Responsive to request 138, library card 146/246, reference image or movie 242, and production asset 144/244 may then be delivered back to system 100/200 by user 126/226 as payload 140/240.

FIG. 3 shows exemplary library file 346, according to one implementation. Library file 346 corresponds in general to library file 146/246 in FIGS. 1A and 2A, as well as to library file 246 in FIG. 2B discussed below, and those corresponding features may share the characteristics attributed to any of those corresponding features by the present disclosure.

As shown in FIG. 3, library file 146/246/346 may take the form of a structured text file including request 138, metadata identifying what production assets, and which properties of those production assets, were expected to be produced or changed by user 126/226 in response to request 138, and production asset data 245 provided by user 126/226. It is noted that, in addition to request 138, metadata specification 139 provided with request 138, and production asset data 245, the additional files delivered to system 100 in payload 140/240 may include production asset 144/244 and reference image or movie 242 to be linked to library file 146/246 in production asset library 119.

FIG. 4 shows exemplary asset metadata modification mode 415b of multi-mode UI 115 provided by asset librarian software code 110/210 for use by user 126/226. It is noted that asset metadata modification mode 415b corresponds in general to asset metadata modification mode 115b/215b in FIGS. 1B, 2A and 2B and those corresponding features may share the characteristics attributed to any of those corresponding features by the present disclosure.

According to the exemplary implementation shown by FIGS. 1A and 2A, payload 140/240 may be received by workstation 120c of system 100, and user 128 may utilize asset librarian software code 110/210 in publisher mode 115c/215c on workstation 120c to use library file 146/246/346 to validate that the information to be published into production asset library 119 is correct. In some implementations, for example, preview metadata 247 included in production asset data 245 may be used to generate a 2D or 3D image of production asset 144/244 for display on workstation 120c as part of the validation process. For example, in one implementation, preview metadata 247 may be used by preview engine 111 of system 100/200 to automatically derive a visual preview, such as a 3D turntable for a character or prop, or an animation clip for a piece of animation linked to a character and shot.

Figure 5:
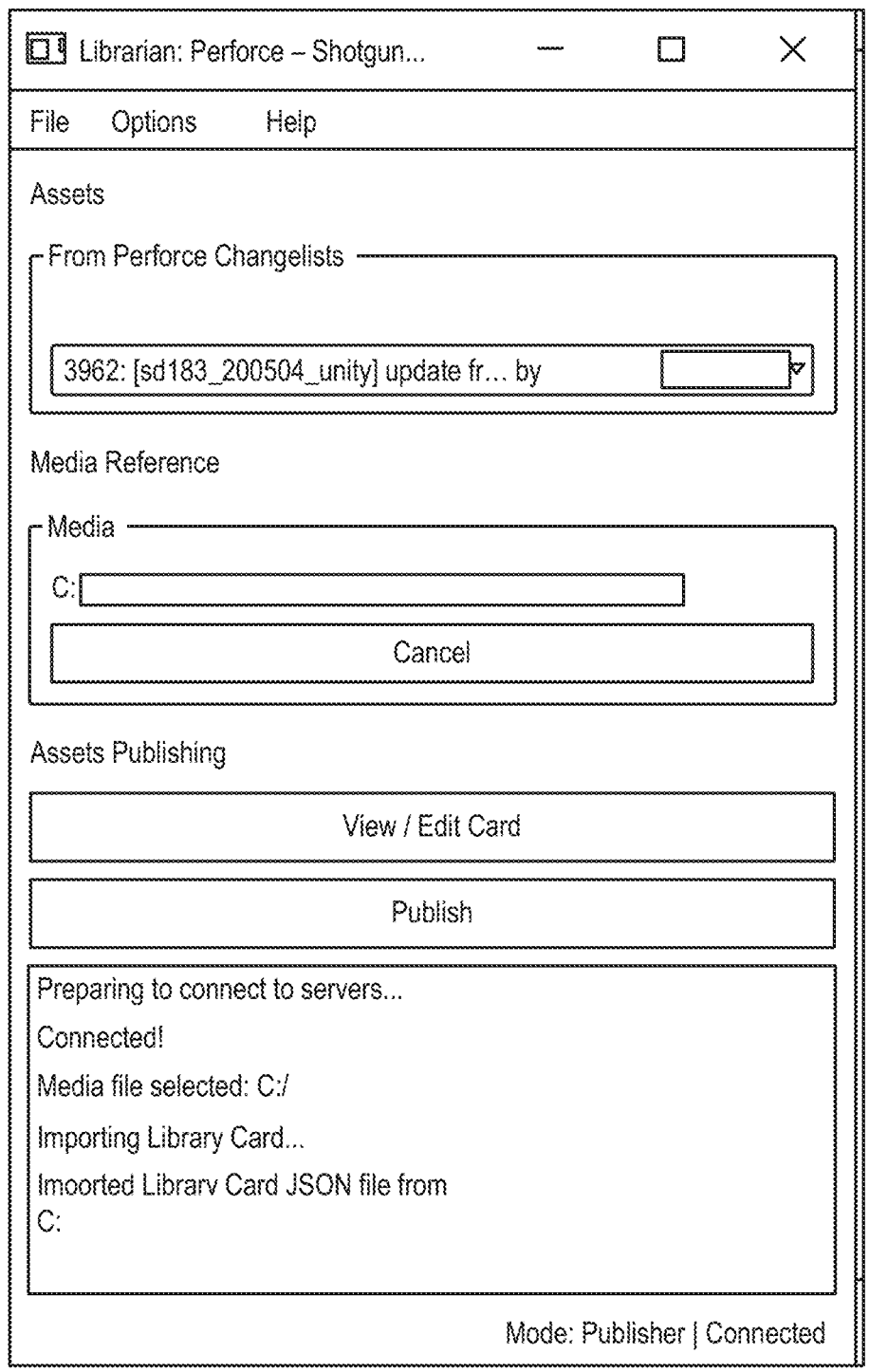
FIG. 5 depicts a publisher mode of the multi-mode UI provided by the software code implemented in the systems shown in FIGS. 1A and 1B, according to one implementation.

Once payload 140/240 has been received from user 126/226 and has been validated using library file 146/246/346, user 128 may utilize asset librarian software code 110/210 in publisher mode 115c/215c to publish library file 146/246 including production asset data 245 to production asset library 119 using publication engine 112. FIG. 5 shows exemplary publisher me de 515c of multi-mode UI 115 provided by asset librarian software code 110/210. It is noted that publisher mode 515c corresponds in general to publisher mode 115c/215c in FIGS. 1B, 2A, and 2B, and those corresponding features may share the characteristics attributed to any of those corresponding features by the present disclosure.

Figure 2B:
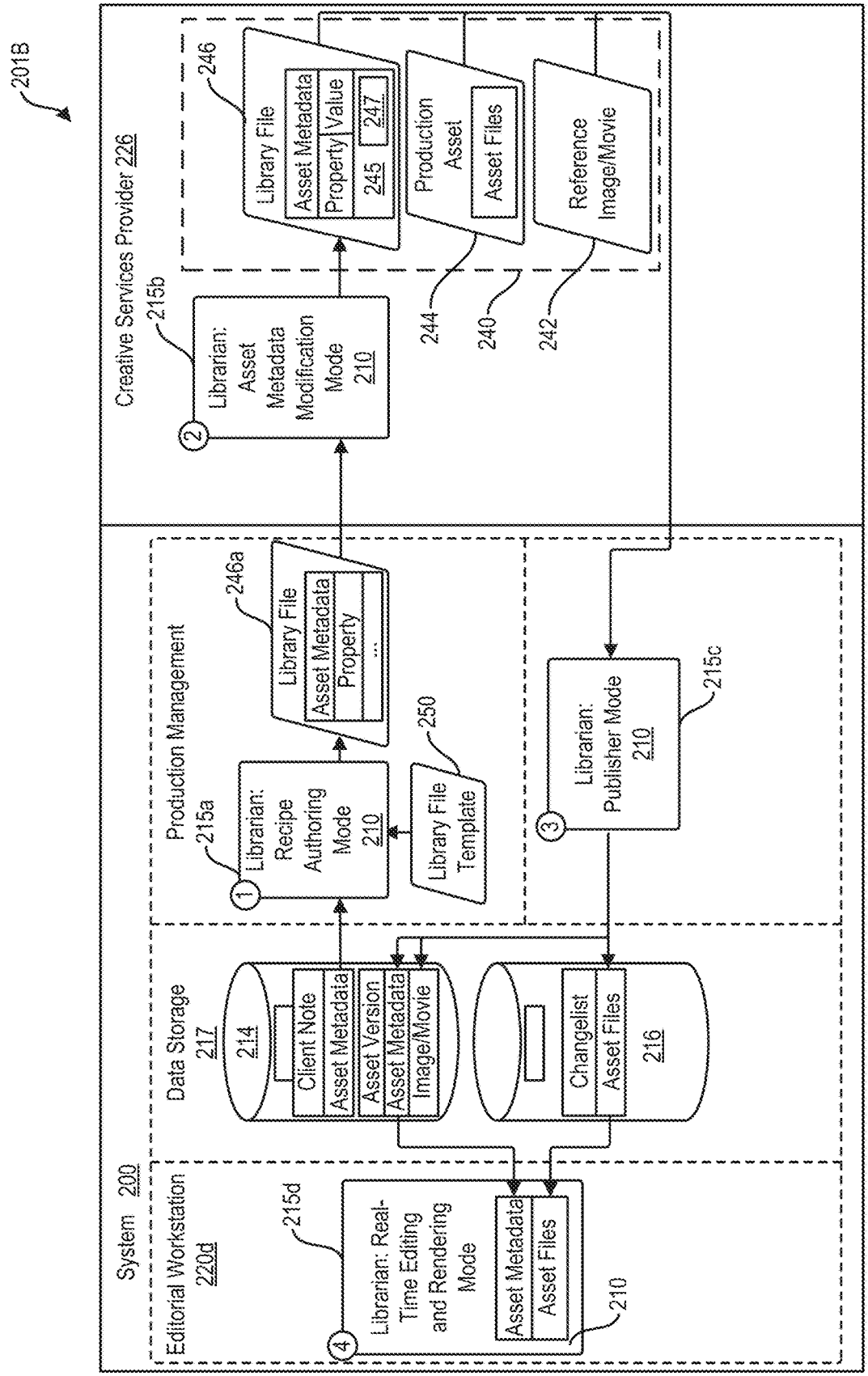
FIG. 2B shows a diagram depicting an exemplary production pipeline of the exemplary systems shown in FIGS. 1A and 1B, according to another implementation.

Referring to FIG. 2B, FIG. 2B shows a diagram depicting exemplary production pipeline 201B, according to another implementation. It is noted that features identified in FIG. 2B by reference numbers identical to those appearing in FIG. 2A correspond respectively to those previously described features, and may share any of the characteristics attributed to those corresponding features, above. It is further noted that production pipeline 201B differs from production pipeline 201A in one significant way. As shown in FIG. 2B, in exemplary production pipeline 201B, library file 146/246/346 is generated by user 124 of system 100 using workstation 120a and librarian software code 110/210 in recipe authoring mode 115a/215a, and is transferred to user 126/226 prior to generation of payload 140/240. That is to say, according to the exemplary implementation shown in FIG. 2A, library 146/246/346 is generated by user 126 on workstation 120*b* using librarian software code 110/210 in asset metadata modification mode 115*b*/216*b*/415*b*, in response to request 138 generated by user 124 on workstation 120*a* using librarian software code 110/210 in recipe authoring mode 115*a*/215*a*. By contrast, according to the alternative implementation shown in FIG. 2B, library file 146/246/346 is generated by user 124 on workstation 120*a* using librarian software code 110/210 in recipe authoring mode 115*a*/215*a*, and is subsequently modified by user 126 on workstation 120*b* using librarian software code 110/210 in asset metadata modification mode 115*b*/216*b*/415*b*.

As is the case for production pipeline 201A in FIG. 2A, according to the exemplary implementation shown in FIG. 2B, once library card 146/246/346 and payload 140/240 have been received from user 126/226 and payload 140/240 has been validated using library card 146/246/346, user 128 may utilize asset librarian software code 110/210 in publisher mode 115*c*/215*c* to publish library file 146/246/346 including production asset data 245 to production asset library 119 using publication engine 112. Thus, whether implemented as part of the production pipeline shown in FIG. 2A or 2B, asset librarian software code 110/210 advantageously enables system 100 to validate production assets and associated data produced or modified by user 126/226 in response to creative requests authored using asset librarian software code 110/210, and to publish those files for storage in production asset library 119.

After publication, an editor, artist, or other production professional may utilize asset librarian software code 110/210 in real-time editing and rendering mode 115*d*/215*d* to access production assets stored in production asset library 119 in order to inspect the properties of those assets or to select them for inclusion in a cut. In some implementations, for example, asset librarian software code 110/210 may enable inspection of properties relating to 3D assets stored in production asset library 119, as well as how those properties compare to the properties of 3D real-time rendered assets currently incorporated in the cut, as part of a real-time content creation pipeline. For example, user 124 of system 100 may receive notification 148, at workstation 120*a*, alerting user 124 that library file 146/246/346 linked to production asset 144/244 has been published to production asset library 119. Moreover, in some implementations, user 124 may be alerted to publication of library file 146/246/346 substantially concurrently with that publication.

Figure 6:
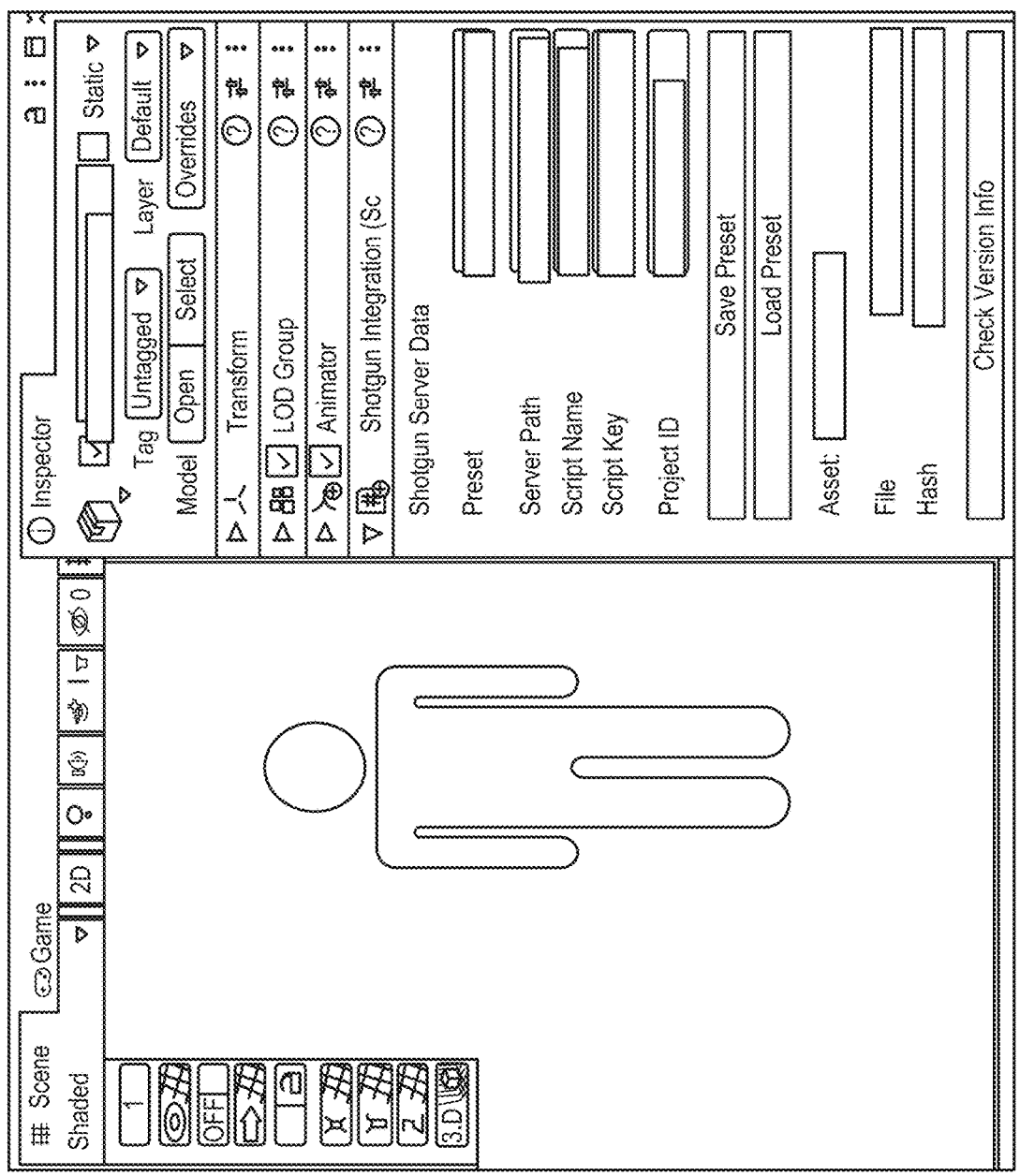
FIG. 6 depicts a real-time editing and rendering mode of the multi-mode UI provided by the software code implemented in the systems shown in FIGS. 1A and 1B, according to one implementation.

FIG. 6 shows exemplary real-time editing and rendering mode 615*d* of multi-mode UI 115 provided by asset librarian software code 110/210 and useable by an editor, artist, or other production professional to inspect and select assets stored in production asset library 119 for inclusion in a cut. It is noted that real-time editing and rendering mode 615*d* corresponds in general to real-time editing and rendering mode 115*d*/215*d* in FIGS. 1B, 2A, and 2B, and those corresponding features may share the characteristics attributed to any of those corresponding features by the present disclosure. It is further noted that, because, as part of publication asset librarian software code 110/210 has stored references linking production asset 144/244 to library file 146/246/346, an artist or editor may use multi-mode UI 115 in real-time editing and rendering mode 115*d*/215*d*/615*d* to learn about the current state, as well as the history, of the production assets stored in production asset library 119.

The functionality of asset librarian software code 110/210 will be further described by reference to FIG. 7, which shows flowchart 700 presenting an exemplary method for use by system 100 to perform production asset library management, according to one implementation. With respect to the actions outlined in FIG. 7, it is noted that certain details and features have been left out of flowchart 700 in order not to obscure the discussion of the inventive features in the present application. It is further noted that each of the actions described by flowchart 700 may be performed by asset librarian software code 110/210, executed by processing hardware 104 of computing platform 102, using the approaches discussed above by reference to production pipelines 201A and 201B in respective FIGS. 2A and 2B.

Figure 7:
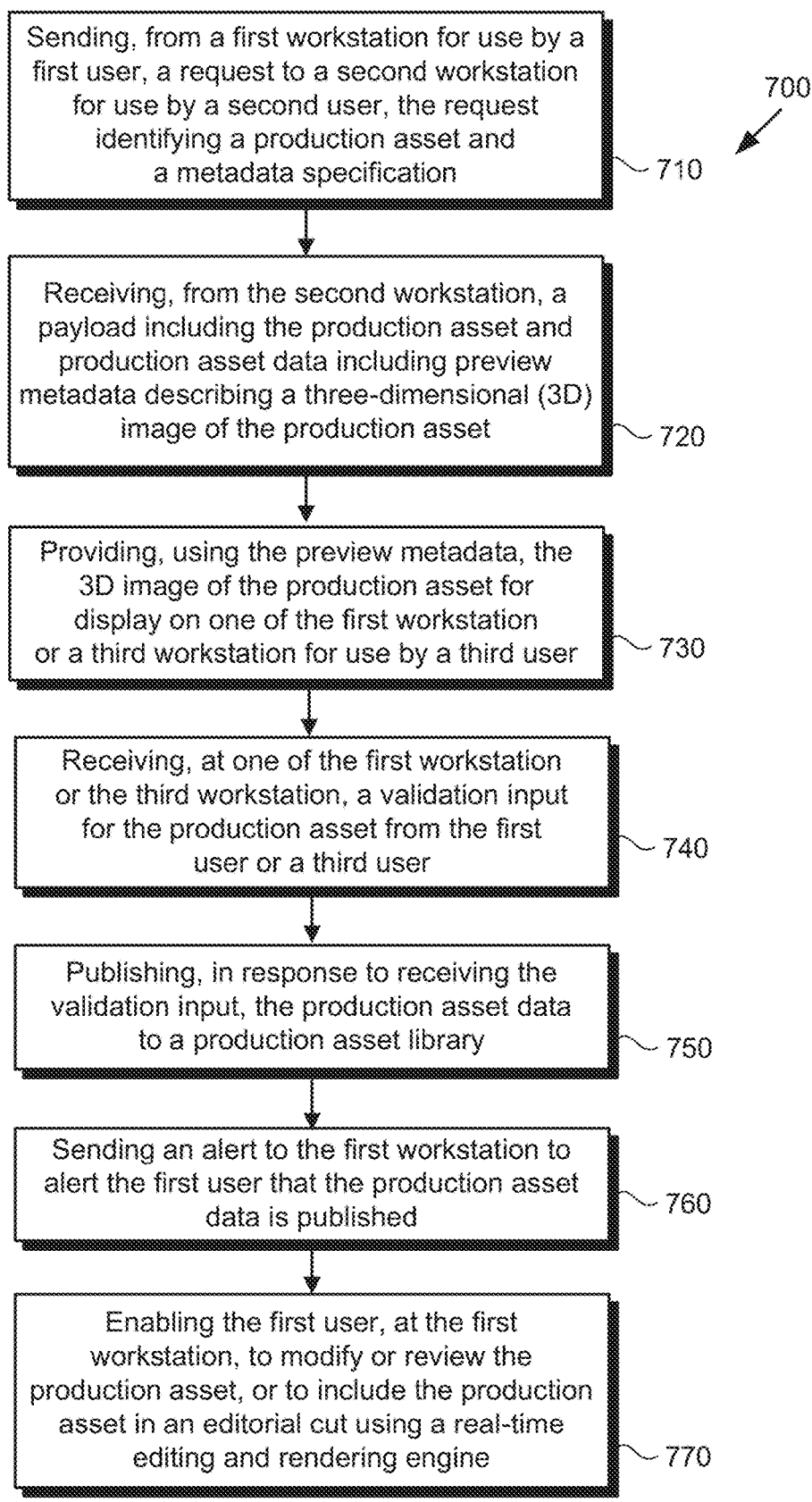
FIG. 7 shows a flowchart presenting an exemplary method for use by a system to perform production asset library management, according to one implementation.

Referring to FIG. 7 in combination with FIGS. 1A, 2A, and 2B flowchart 700 includes sending, from a first workstation for use by a first user, e.g., from workstation 120*a* used by user 124, request 138 to a second workstation for use by a second user, e.g., workstation 120*b* used by user 126, where request 138 identifies production asset 144/244 and associated metadata specification 139 for production asset 144/244 (action 710). Flowchart 700 also includes receiving, from the second workstation, e.g., workstation 120*b*, payload 140/240 including production asset 144/244 and production asset data 245 including preview metadata 247 describing a 2D or 3D image of production asset 144/244 (action 720). As stated above, payload 140/240 may be received at workstation 120*a* or 120*c* of system 100.

Flowchart 700 further includes providing, using preview metadata 247, the 3D image of production asset 144/244 for display on the first workstation or a third workstation for use by a third user, e.g., workstation 120*a* or 120*c* (action 730), receiving, at the first workstation or the third workstation, a validation input for production asset 144/244 from the first user or the third user, e.g., user 124 or 128 (action 740), and publishing, in response to receiving the validation input, production asset data 245 to production asset library 119 (action 750). For example, and as noted above, according to the exemplary implementation shown by FIGS. 1A and 2A, user 128 may utilize asset librarian software code 110/210 in publisher mode 115*c*/215*c*/515*c* on workstation 120*c* to use library file 146/246/346 to validate that the information to be published into production asset library 119 is correct. Alternatively, user 124 or 128 may utilize asset librarian software code 110/210 in publisher mode 115*c*/215*c*/515*c* on workstation 120*a* to use library file 146/246/346 to validate that the information to be published into production asset library 119 is correct.

Once payload 140/240 has been received from user 126/226 and has been validated using library file 146/246/346, user 128 may utilize asset librarian software code 110/210 in publisher mode 115*c*/215*c* on workstation 120*c* to publish library file 146/246 including production asset data 245 to production asset library 119 using publication engine 112. Alternatively, user 124 or 128 may utilize asset librarian software code 110/210 in publisher mode 115*c*/215*c* on workstation 120*a* to publish library file 146/246 including production asset data 245 to production asset library 119 using publication engine 112.

In some implementations, the method outlined by flowchart 700 may conclude with action 750. However, in other implementations, that method may continue with one or both of sending an alert to the first workstation to alert the first user, or sending an alert to another workstation to alert another user of system 100, e.g., using notification 148, that production asset data 245 is published (action 760) and enabling the first user at the first workstation, or the other user at the other workstation, to modify or review production asset 144/244, or include production asset 144/244 in an editorial cut using a real-time editing and rendering engine (action 770). It is noted that in various implementations, the user receiving notification 148 might modify production asset 144/244 directly, or alternatively may request further modifications to production asset 144/244 by user 126/226, e.g., by initiating action 710 again.

Thus, in some implementations, flowchart 700 may conclude with action 750 or 760, while in others flowchart 700 may conclude with action 770 and may include or omit action 760. It is noted that in some implementations in which both of actions 760 and 770 are performed, action 770 may precede action 760. Moreover, in some implementations actions 760 and 770 may be performed substantially concurrently with one another, and in some implementations one or both of actions 760 and 770 may be performed substantially concurrently with action 750. In still other implementations, actions 760 or 770 may be followed by one or more additional iterations of actions 710, 720, 730, 740, and 750 (hereinafter "actions 710-750"), or actions 710-750 and 760, or actions 710-750 and 770, or actions 710-750, 760, and 770.

It is further noted that in some implementations, processing hardware 104 is configured to execute asset librarian software code 110/210 to enable the first user at the first workstation or the other user at the other workstation to visualize or inspect the properties of production asset 144/244 in real-time using production asset data 245 received from user 126/226. As discussed above, asset librarian software code 110/210 is configured to provide multi-mode UI 115 including recipe authoring mode 115a/215a for use by the first user, and asset metadata modification mode 115b/215b/415b for use by the second user. As further discussed above, asset metadata modification mode 115b/215b/415b of multi-mode UI 115 enables the second user to package or visualize production asset 144/244, as well as to modify metadata describing production asset 144/244 and provided with request 138.

As shown and described by reference to FIGS. 1A and 2A, in some implementations, asset metadata modification mode 115b/215b/415b of multi-mode UI 115 is used by the second user at the second workstation to generate library file 146/246 using request 138 and metadata specification 139 provided with request 138, library file 146/246/346 further including production asset data 245. As shown and described by reference to FIG. 2B, in some implementations, recipe authoring mode 115a/215a of multi-mode UI 115 is used by the first user at the first workstation to generate library file 146/246 including request 138 and the metadata describing production asset 144/244 provided with request 138. In those latter implementations, receiving request 138 from the first workstation includes receiving library file 146/246 in action 710, and transferring request 138 to the second user in action 720 includes transferring library file 146/246/346 to the second user. Furthermore, publishing production asset data 245 in action 760 may include publishing library file 146/246/346 to production asset library 119.

With respect to the method outlined by flowchart 700, it is noted that actions 710-760, or actions 710-760 and 770, or actions 710-760 and 780, or actions 710-760 and 770 followed by action 780, or actions 710-760 and 780 followed by action 770, or any iterations of those actions, may be performed in an automated process from which human involvement can be omitted.

Thus, the present application discloses systems and methods for performing production asset library management that address and overcome the deficiencies in the conventional art. As discussed above, the present production asset library management systems and methods provide 2D and 3D asset publishing and management tools that advantageously help to enable a process for exposing 2D and 3D production assets when generating editorial cuts in a content creation pipeline. That is to say, the present solutions help to gate entry into the production database to assets that conform to specifications defined by the editors and artists, which may be particularly important in workflows that outsource a significant portion of the asset creation and leverage real-time editing and rendering platforms, such as game engines. Moreover, the production asset library management solutions disclosed herein may advantageously be implemented as substantially automated systems and methods.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system including a computing platform communicatively coupled to at least a first workstation, a remote second workstation remote from the computing platform, and a production asset library, the computing platform comprising a processing hardware, a game engine implemented as a visual development environment and a memory storing a software code configured to provide a multi-mode user interface (UI), the multi-mode UI including a first mode configured for use at the first workstation and a second mode configured for use at the remote second workstation;

the processing hardware configured to execute the software code to:
send, from the first workstation configured to be used by a first user, a request generated using the multi-mode UI in the first mode, to the remote second workstation configured to be used by a second user different from the first user, the request identifying a production asset and metadata specification;
receive, from the remote second workstation via a communication network, a payload produced by the second user at the remote second workstation using the multi-mode UI in the second mode, the payload including the production asset and production asset data including preview metadata describing a three-dimensional (3D) image of the production asset, a metadata type of the preview metadata being selected by the second user subject to one or more predefined constraints;
automatically generate, using the game engine and the preview metadata in response to receiving the payload, the 3D image of the production asset for display on one of the first workstation or a third workstation communicatively coupled to the computing platform as part of a validation process for the payload, the third workstation configured to be used by a third user;
receive, at the one of the first workstation or the third workstation in response to display of the 3D image of the production asset, a validation input for the production asset from one of the first user or the third user; and publish, in response to receiving the validation input, the production asset data to the production asset library;

wherein the game engine implemented as the visual development environment automatically generating the 3D image of the production asset using the preview metadata enables the one of the first user or the third user to validate the production asset visually, in real-time with respect to receiving the payload produced by the second user.

2. The computing platform of claim 1, wherein the processing hardware is further configured to execute the software code to:

send an alert to the first workstation to alert the first user that the production asset data is published; and enable the first user, at the first workstation, to modify or review the production asset, or include the production asset in an editorial cut.

3. The computing platform of claim 2, wherein the processing hardware is further configured to execute the software code to send the alert concurrently with publishing the production asset data.

4. The computing platform of claim 1, wherein the processing hardware is further configured to execute the software code to enable the first user, at the first workstation, to modify or review the production asset, or include the production asset in the editorial cut in real-time with respect to receiving the production asset data from the remote second workstation used by the second user.

5. The computing platform of claim 1, wherein the first mode of the multi-mode UI comprises a recipe authoring mode configured for use at the first workstation and the second mode of the multi-mode UI comprises an asset metadata modification mode configured for use at the remote second workstation.

6. The computing platform of claim 5, wherein the second user is a third party vendor, and wherein the asset metadata modification mode of the multi-mode UI enables the third party vendor to modify the production asset.

7. The computing platform of claim 5, wherein the second user is a third party vendor, and wherein the asset metadata modification mode of the multi-mode UI enables the third party vendor to 1) modify a metadata included with the request, wherein the metadata describes the production asset, 2) add a preview reference image or video, or 3) a combination thereof.

8. The computing platform of claim 7, wherein modification options for modifying the metadata included with the request are determined by a controlled taxonomy that has been predefined.

9. The computing platform of claim 1, wherein the multi-mode UI enables at least one of the first workstation or the remote second workstation to generate a library file for publication to the production asset library, the library file including the request and a metadata describing the production asset.

10. The computing platform of claim 9, wherein the first mode of the multi-mode UI is configured to be used at the first workstation to generate the library file, wherein receiving the request comprises receiving the library file, and wherein sending the request comprises sending the library file to the second user at the remote second workstation.

11. The computing platform of claim 9, wherein the second mode of the multi-mode UI is configured to be used at the remote second workstation to generate the library file using the request and the metadata describing the production asset received from the first workstation, wherein the library file further includes the production asset data, and wherein receiving the payload further comprises receiving the library file.

12. The computing platform of claim 1, wherein the first workstation and the third workstation are a same workstation.

13. A method for use by a system including a computing platform communicatively coupled to at least a first workstation, a remote second workstation remote from the computing platform, and a production asset library, the computing platform comprising a processing hardware, a game engine implemented as a visual development environment and a memory storing a software code configured to provide a multi-mode user interface (UI), the multi-mode UI including a first mode configured for use at the first workstation and a second mode configured for use at the remote second workstation, the method comprising:

sending, by the software code executed by the processing hardware and from the first workstation configured to be used by a first user, a request generated using the multi-mode UI in the first mode, to the remote second workstation configured to be used by a second user different from the first user, the request identifying a production asset and metadata specification;

receiving, by the software code executed by the processing hardware, from the remote second workstation via a communication network, a payload produced using the multi-mode UI in the second mode, the payload including the production asset and production asset data including preview metadata describing a three-dimensional (3D) image of the production asset, a metadata type of the preview metadata being selected by the second user subject to one or more predefined constraints;

automatically generating, by the software code executed by the processing hardware and using the game engine and the preview metadata in response to receiving the payload, the 3D image of the production asset for display on one of the first workstation or a third workstation communicatively coupled to the computing platform as part of a validation process for the payload, the third workstation configured to be used by a third user;

receiving, by the software code executed by the processing hardware, from the one of the first workstation or the third workstation in response to display of the 3D image of the production asset, a validation input for the production asset from one of the first user or the third user; and publishing, by the software code executed by the processing hardware, in response to receiving the validation input, the production asset data to the production asset library;

wherein the game engine implemented as the visual development environment automatically generating the 3D image of the production asset using the preview metadata enables the one of the first user or the third user to validate the production asset visually, in real-time with respect to receiving the payload produced by the second user.

14. The method of claim 13, further comprising:
sending an alert, by the software code executed by the processing hardware to alert the first user at the first workstation, the first user that the production asset data is published; and
enabling, by the software code executed by the processing hardware, the first user at the first workstation to modify or review the production asset, or include the production asset in an editorial cut.

15. The method of claim 14, wherein sending the alert is performed concurrently with publishing the production asset data.

16. The method of claim 13, wherein enabling the first user at the first workstation to modify the production asset enables the first user to modify or review the production asset, or include the production asset in an editorial cut in real-time with respect to receiving the production asset data from the remote second workstation used by the second user.

17. The method of claim 13, wherein the first mode of the multi-mode UI comprises a recipe authoring mode configured for use at the first workstation and the second mode of the multi-mode UI comprises an asset metadata modification mode configured for use at the remote second workstation.

18. The method of claim 17, wherein the second user is a third party vendor, and wherein the asset metadata modification mode of the multi-mode UI enables the third party vendor to modify the production asset.

19. The method of claim 17, wherein the second user is a third party vendor, and wherein the asset metadata modification mode of the multi-mode UI enables the third party vendor to 1) modify a metadata included with the request, wherein the metadata describes the production asset, 2) add a preview reference image or video, or 3) a combination thereof.

20. The method of claim 18, wherein modification options for modifying the metadata included with the request are determined by a controlled taxonomy that has been predefined.

21. The method of claim 13, wherein the multi-mode UI enables at least one of the first workstation or the remote second workstation to generate a library file for publication to the production asset library, the library file including the request and a metadata describing the production asset.

22. The method of claim 21, wherein the first mode of the multi-mode UI is configured to be used at the first workstation to generate the library file, wherein receiving the request comprises receiving the library file, and wherein sending the request comprises sending the library file to the second user at the remote second workstation.

23. The method of claim 21, wherein the second mode of the multi-mode UI is configured to be used at the remote second workstation to generate the library file using the request and the metadata describing the production asset received from the first workstation, wherein the library file further includes the production asset data, and wherein receiving the payload further comprises receiving the library file.

24. The method of claim 13, wherein the first workstation and the third workstation are a same workstation.

* * * * *